United States Patent [19]
Gulick

[11] 3,755,152
[45] Aug. 28, 1973

[54] REMOVING CONTAMINANTS FROM ORGANIC MATERIALS
[75] Inventor: Graham L. Gulick, Chicago, Ill.
[73] Assignee: Quvoe Chemical Industries, Inc., Schiller Park, Ill.
[22] Filed: Sept. 14, 1970
[21] Appl. No.: 72,185

[52] U.S. Cl................. 208/307, 208/245, 208/306, 208/91, 260/448.2 R
[51] Int. Cl........................................... C10g 25/04
[58] Field of Search.................... 208/245, 307, 306, 208/91; 260/448.2

[56] References Cited
UNITED STATES PATENTS

| | | | |
|---|---|---|---|
| 2,961,396 | 11/1960 | Beck | 208/26 |
| 3,211,644 | 10/1965 | Clark | 208/245 |
| 1,759,343 | 5/1930 | Carpenter et al. | 208/307 |
| 2,202,806 | 5/1940 | Alton et al. | 210/203 |
| 3,094,569 | 6/1963 | Thomas | 208/245 |
| 3,098,814 | 7/1963 | Epperly | 208/245 |
| 3,654,144 | 4/1972 | Collins | 208/245 |
| 2,060,091 | 11/1936 | Lyman | 208/245 |
| 3,654,144 | 4/1972 | Collins | 208/307 R |

FOREIGN PATENTS OR APPLICATIONS

| | | | |
|---|---|---|---|
| 287,141 | 2/1929 | Great Britain | 208/307 |

Primary Examiner—Delbert E. Gantz
Assistant Examiner—Juanita M. Nelson
Attorney—James T. FitzGibbon

[57] ABSTRACT

A treating method is described wherein oils or other organic liquids having contaminants therein which are difficult to separate from the oils are removed by mixing and finely subdividing granules of two different surface active adsorbents, such as an activated carbon adsorbent and a molecular sieve adsorbent, adding the mixed adsorbents to the contaminated oil or the like, and, preferably with high shear mixing and heating, allowing the mixed adsorbents to remove the contaminants, and separating the colloidal sized solid adsorbents from the treated materials in a suitable manner, such as by filtration, for example. Examples of oils able to be treated include non-hydrocarbon oils such as silicone oils as well as hydrocarbon oils such as mineral oils and the like. With this method, it is possible to in some instances remove contaminants without removing additives, if desired.

9 Claims, No Drawings

REMOVING CONTAMINANTS FROM ORGANIC MATERIALS

BACKGROUND OF THE INVENTION

The present invention relates to methods for treating organic materials and the like. More particularly, the invention is directed to methods of treating oils, and other organic materials to remove contaminants therefrom. In certain cases, removing contaminants is a very important process. In the field of high vacuum technology, for example, the field of electron and cathode ray tube manufacture, the field of evaporative metal coating, including cathodic sputtering, and other fields, an essential operation must be performed in a high vacuum, generally of the order of $10^{-4}$ millimeters of mercury or higher. In such fields, it is common to use oil diffusion pumps to establish and maintain a vacuum within the evacuated region in question. As an example, in the manufacture of television tubes, vacuum tubes, etc., a region is evacuated so that a metal coating may be evaporated onto a gas-free surface. The oil diffusion pump has been known for some time as a device which is useful for maintaining such high vacuums. Oil diffusion pumps are in common use for scientific purposes and are ordinarily associated in use with the vacuum devices referred to herein, as well as electron microscopes and other apparatus. It is now well known in the art that the performance of oil diffusion pumps useful with such apparatus has been significantly improved where a silicone oil is used therein. However, because of the nature of silicone oils, such products are extremely expensive, typical grades thereof suitable for use in diffusion pumps selling for about $110.00 a gallon or more. In a typical television tube manufacturing operation, it is common to use perhaps 200 gallons or more of this oil per week. However, this oil, from a practical standpoint, is not consumed in use, but is merely contaminated.

The test for contamination is strictly functional, that is, when the oil, for one reason or another, becomes contaminated, the diffusion pump in which it is used is no longer able to maintain the level of vacuum which can be maintained with clean oil. Accordingly, such contaminated oil is discarded, in spite of its extremely high original cost. Consequently, attempts have been made to remove the contaminants from such oils, but to my knowledge, all such attempts have been a practical failure. The attempts of which I am aware include attempts at filtration, distillation, adsorption, etc.

The present invention is directed to a method of preparing a mixture of adsorbent materials and using these mixed adsorbents to remove the contamination which neither adsorbent alone, or in sequential treatment, is able to remove. The treatment which is effectively able to remove contaminants from the silicone oil functions equally well with other oils, for example a mineral seal oil having additives therein and such an oil may typically be treated for removal of staining components therefrom. The method is also useful for removing other contaminants from liquid organic compounds.

In view of the practical impossibility in the prior art of decontaminating various organic materials including certain oils, an object of the present invention is to provide a novel method for the treatment of contaminated oils and other organic materials.

A further object is the provision of a method which is particularly adaptable to remove contaminants from oils which contaminants cannot be removed by distillation or conventional adsorption techniques.

Another object is the provision of a method of oil refining or re-treatment which may be carried out using simple apparatus under mild conditions.

A still further object is the provision of a method of purifying oils or other materials wherein different types of surface active materials are mixed and then used simultaneously for treatment of the contaminated oils or the like.

A still further object is the provision of a method of removing contaminants in organic materials which includes mixing different adsorbents together, reducing them to an extremely finely subdivided particle size, adding them after mixing thereof together to the oil to be treated, and thereafter mising the oil with the adsorbents and subsequently separating the adsorbents and the contaminants from the oil.

A still further object of the invention is the provision of a method for treating oils to remove contaminants therefrom which is equally effective with silicone oils, hydrocarbon oils including hydrocarbon oils having additives therein and other contaminated organic materials. The exact manner in which these objects are achieved will be more clearly understood when reference is made to the following detailed description of the preferred embodiments of the invention set forth herein by way of example.

The foregoing objects, and other inherent objects of the invention are accomplished, by way of example, by adding granular particles of a molecular sieve to particles of surface active agent such as activated carbon, milling the two components to colloidal size, adding them to contaminated organic material and, with or without a filter aid, to the oil or the like which is then preferably heated somewhat and filtered to remove the mixed adsorbents having the contaminants adsorbed thereon.

DESCRIPTION OF THE PREFERRED EMBODIMENTS OF THE INVENTION

Example 1

A silicone oil which had been used commercially in the manufacture of television tubes was obtained, and an 800 ml. sample thereof was observed to be a brown, dirty color. This contaminated oil was unable to maintain a vacuum level higher than $5 \times 10^{-5}$ mm. of mercury (Torricelli or Torr). When new, this oil was able to produce twice this vacuum, that is about $2.5 \times 10^{-5}$ Torr. 20 grams of a specific adsorbent, sometimes referred to as a molecular sieve because of the ability thereof to adsorb selectively material of a specific particle size or a narrow range of particle sizes, is added to about one-half the amount, that is, 10 grams of an activated carbon adsorbent material. The particular molecular sieve used in this example was known as Linde Molecular Sieve 13-X. The activated carbon was a Darco G-60. These adsorbents were placed in a ball mill and reduced to a fine, colloidal powder. These mixed adsorbents were then added to the 800 ml. of oil and the temperature thereof was raised to 60° C while the oil was being continuously agitated for a period of about one hour. Upon filtration to remove the adsorbents and the impurities contained thereon, 725 ml. of a clear, light yellow colored oil resulted. This oil demonstrated performance in a diffusion pump which was greatly improved over the performance of the oil prior to treatment thereof.

Example 2

A treating process was carried out in the same manner as the process of Example 1, except that a filter aid in the amount of 10 grams was added to the mixed adsorbents prior to their addition to the oil. The quality of the resulting product was substantially the same, except that the time required for filtration was reduced. In this example, a filter aid known as "J-M Super Cel" was used, i.e., a form of diamaceous earth.

Example 3

800 ml. of silicone oil was treated as set forth in Example 2, above. Thereafter, the 725 ml. batch remaining after filtration was treated with 10 grams of molecular sieve 13-X, 5 grams of activated carbon and 5 grams of filter aid prepared in the manner described above. The oil was again stirred vigorously and continually for about one hour while the temperature thereof was raised to about 60° C. Upon subsequent filtration, about 625 ml. of silicone oil was recovered, which was of a clarity substantially equal to that of water.

Oil when treated according to any of the three foregoing examples was able to provide performance which was greatly improved in relation to that of the contaminated oil and which, for practical purposes, performed as well as a new silicone oil. Accordingly, it can be seen that in view of the virtually insignificant cost of the materials used, and in view of the simplicity of the operation, especially in relation to the cost of the silicone oil material, a great cost saving was able to be realized in connection with tube manufacture.

Example 4

A method according to Example 3 was carried out, except that only about one-half of the amount of molecular sieve and other adsorbents were used in relation to the amount of silicone oil. The resulting oil product was substantially the same in appearance and performance as was the oil produced according to the foregoing Example 3.

Example 5

A contaminated silicone diffusion pump oil was treated with about 20 grams of Molecular Sieve 13-X per 800 ml. of silicone oil, and thereafter with a much greater amount thereof. This process was in every other respect similar to that of Examples 1, 2, or 3, except that no activated carbon adsorbent was used. No useful result was able to be obtained in this way.

Example 6

A treatment was carried out as set forth in any of Examples 1–3 above, except that, although everything else remained the same, no Molecular Sieve adsorbent was used. Regardless of the quantity of carbon used, or variation in other parameters, it was not possible to remove significant amounts of contamination from the oil.

Example 7

An attempt was made to separate contaminants from a used silicone oil as set forth in Examples 1–3 above, except that, instead of the absorbents being mixed together and added to the oil, first one adsorbent was added for treatment, followed by removal thereof, and then the other adsorbent was used in a subsequent treatment of the same oil. This method was attempted using the molecular sieve first and the carbon adsorbent subsequently, and vice versa. However, neither of these methods produced any useful result.

From the foregoing, it may be concluded that, for some reason which is not fully understood, an adsorbent having a different character than the character of either individual adsorbent is produced when the two adsorbents are mixed together and reduced to a fine particle size, such as the form of a colloidal powder, before being added to the contaminated material. In the foregoing examples, it was not conclusively established what the nature of the contaminants in the silicone oil was. However, it is believed possible that some of the contamination could be petroleum oil molecules which backstream from the mechanical backup, so-called "fore-pumps" or "roughing" pumps which were used with the system. It is also known that in the removal of air from any evacuable region, certain contaminants are inherently in the air and, of course, the concentration of such contaminants can also be increased if the process carried on in the vacuum region is of a nature that such contaminants are created. Accordingly, it is thought that the contaminated material may include metal particles, oxides, salts, and other impurities as well as organic materials.

The use of this method to treat oils other than silicone oils is illustrated by the following Examples:

Example 8

An automatic transmission fluid was received in a dirty, discolored condition. A mixed adsorbent prepared according to the method of claim 1 was added thereto in the ratio of 1 gram of mixed adsorbent for each 100 ml. of transmission fluid. The adsorbent was effective to remove the contaminants therein, resulting in a fluid having substantially the same clarity and color which characterized it prior to use.

Example 9

A waste oil used as a rolling oil in an aluminum cold forming operation was obtained after use thereof, and, according to prevailing standards, was ready to be discarded. This oil was opaque, and of a dark brown color. In this case, about two-thirds by weight of Molecular Sieve 13-X was mixed with about one-third by weight of an activated carbon adsorbent, and the two were ball milled together for 2 hours to reduce them to a very finely subdivided state. Thereupon, about 4 grams of this material per liter was added to the rolling oil, and the temperature thereof was raised to 60° C with continuous agitation for 1 hour. Thereafter, the mixed adsorbent was removed by filtration, and the resulting oil was a straw yellow material of very good clarity and was suited for reuse as a rolling oil. The rolling oil was believed to be comprised of about 94% to about 95% of a mineral seal oil, which is a petroleum distillate similar to kerosene, but of a higher boiling range, and from about 5% to about 6 % of an additive which was believed to be a mixture of fatty alcohols and esters. This oil is used to cool rollers for sheet aluminum and to prevent adhesion or "pickup" of the aluminum on the steel rolls which are used to cold reduce the thickness of the metal. In use, contamination in the oil builds up by reason of the oil particles becoming carbonized, and by transfer thereto of water, metal soaps and even organic color bodies.

A standard test for the utility of such oil includes placing the oil on a polished aluminum disc and heating it to a standard temperature for a given time to determine if the chromophoric bodies in the oil will stain the aluminum. If not, the oil is considered suitable for continued use, whereas, if a stain results, the oil is not considered suitable for further use, even though the lubricity thereof may not be impaired. In connection with this Example it will be noted that the oil contained an additive which was not removed. It is believed that, in some cases, particularly in those cases wherein the additive for the oil is not highly soluble therein, but only partially soluble, as might be the case with compounds having different degrees of polarity, the step of heating the mixture may serve to increase the solubility of the additive to the point where the adsorbent will not tend to remove it from the solution. The adsorbents in question are believed most effective to remove materials which are somewhat insoluble in the base material even though they may be held therein by strong forces tending to keep them emulsified or dispersed within the body of the solution. Accordingly, such materials, particularly after sufficient high shear agitation become exposed to an interface between the adsorbing particle and the body of the solution. Consequently, in some cases, a high shear agitation is greatly beneficial to the performance of the process, especially in those cases where the impurity or contaminants are strongly held in the solution.

Example 10

A standard solution for evaluating adsorbents comprising one percent by volume each of ethyl acetate, methyl isobutyl ketone and aviation gasoline in anhydrous ethanol was treated with about 3% by weight of mixed adsorbents prepared according to Example 1. After addition, the mix was agitated continually for 1 hour at ambient temperature. Upon filtration, the treated alcohol was mixed with 5 times its volume of water, and, after standing for 15 minutes. the resulting mixture showed only a very slight, almost imperceptible haze. This degree of adsorptive separation of liquid contaminants from ethanol could not be achieved or even approached even using the same adsorbents, provided that the adsorbents were added sequentially, or where one adsorbent was used without the other. Thus, the method of the invention is also useful with other contaminated organic materials; however, it appears important that the adsorbents be mixed and subdivided before the addition thereto of the contaminated material.

As pointed out above, no mechanism is known which would satisfactorily explain the results achieved by the methods described in the examples herein. In this connection, however, it was noted that, upon mixing the adsorbents together and reducing them to a suitably fine size, the resulting mixed adsorbent powder was extremely fluent, actually behaving somewhat as a liquid, in the sense that it was virtually impossible to form it into a pile having significant height in relation to its diameter. Additionally, the powder mixed adsorbent readily flowed through extremely small diameter, deep openings, such as the stems in a filtering funnel, whereas even very finely subdivided activated carbon or molecular sieve materials alone would readily clog these openings.

The apparent mutual replusion of individual particles seeming to account for this phenomenon was also manifested in the fact that the powder of mixed materials did not at all seem to display any visible tendency to wet or adhere to the surfaces of other common materials, such as glass, metal, porcelain, etc. Solid particles having flow characteristics such as those exhibited by the mixed adsorbents are otherwise sometimes produced by intentional efforts to entrap, at least in passing, quantities of air within a bed of solid particles. In this manner, so called "fluidized beds" of material are often created for the purpose of causing solid materials to become very fluent, so that they may be handled somewhat in the manner of a liquid. Since, in the present case, this air, or apparent air, which appeared to be present, was not introduced mechanically, it is believed that perhaps air might be present on the surface of composite particles resulting from some interaction between the two types of adsorbent materials, perhaps an interaction such that particles of one material are coated with particles of the other material, with the result that the individual coated particles thus formed repel each other. For example, in an array of mutually repellent particles, it is common for the particles to have significant quantities of air adsorbed on the surfaces thereof, with more fluent mixtures of this kind behaving somewhat in the manner of a dispersion in which the air is the continuous phase. Accordingly, it is thought possible that in the event the impurities removed by the process of the invention were not removed by prior method, this effect may have occurred because such impurities were present in a form wherein they were surrounded by a minute, protective air jacket, or in a form wherein air formed a portion of a composite impurity particle of colloidal size. The method of the present invention might be useful by presenting a large air-solid interfacial area to which the particles of impurities and their air envelopes would be attracted prior to ultimate separation of the impurities.

It is also considered possible that, in the event the form in which the impurities were present contributed to blocking an adsorption mechanism which should otherwise be effective, the coating of one adsorbent by the other, or the surrounding of either or both materials with a closely held adsorbed air layer might somehow alter the mechanism so as to eliminate whatever effect was causing the same to be blocked. For example, it may be that, in the use of prior materials and methods, adsorptive separation would be taking place at such a slow rate as to be almost totally ineffective or unnoticeable, but that the method of the invention accelerates this blocked or hindered rate very greatly so as to render the process useful and valuable.

At any rate, in reviewing the results achieved with the methods of the foregoing examples, cleaned silicone oils treated according to the methods disclosed herein not only functioned very well is use, but, upon analysis by infrared spectroscopy, showed only the same adsorption bands as those characterizing the pure material, whereas contaminated oil, when so analyzed, showed the presence of many other chemical structures characterized of the contaminating compounds.

As the term is used herein, the expression "molecular sieve" refers to a material which is adapted to adsorb, preferentially or exclusively, particles having a particular particle size, or a narrow range of particle sizes. Such materials, usually synthetic zeolites, may be identified and purchased from commercial sources and are usually specified and described in relation to the particle sizes or ranges of sizes that are intended to be adsorbed. Typically, Molecular Sieve "13-X" described herein adsorbs particles of 13 angstroms and smaller, similar products identified as LMS-Type 4A and LMS - 5A (Linde Air Products Company) adsorb materials of about 4 angstroms and 5 angstroms or less, respectively. Such materials are ordinarily, at least in most particle sizes, characterized by having surface areas within the volume of each particle ranging from several times up to 700 or 800 times the surface areas of the exteriors of each particle, with the result that adsorption is believed to take place largely within the body of the material, which is accordingly sometimes thought of and characterized as a sponge or sieve for molecules of certain sizes. These and other properties of Molecular Sieves are well known to those skilled in the art, reference being made thereto in a number of publications, including a book entitled Molecular Sieves, by C. K. Hersh, (Reinhold Pub., 1961).

Example 11

Another unexpected property of the method of the present invention was demonstrated as follows. A mixed adsorbent prepared according to Example 1 hereof was added to a contaminated spindle oil or rolling oil of the type referred to in Example 9, according to the method set forth therein, with a diatomaceous earth filter aid being used therewith to aid adsorbent recovery. The adsorbent was used in a quantity of about one to about three parts by weight per 100 parts of contaminated oil. Upon removing the adsorbent material from the oil by filtration, the oil was found to be purified to the standards set forth in Example 9. Furthermore, quite surprisingly, thereafter merely pouring substantial amounts of additional contaminated oil through the filter cake resulting from the previous filtering operation was effective to remove contaminants from about an equal or greater volume of oil than that which was originally treated. In reference to rolling oils and other oils which are used in a form with additives therein, it should be noted that previous attempts to remove impurities from rolling oils of the type referred to herein were not found practical, since methods which were able to remove significant amounts of impurities also undesirably removed the additives, which, in an oil of this type are not only necessary, but are very expensive, even considering that they are used in only minor proportions. Thus, the value of this process from an economical standpoint was clearly demonstrated.

It will thus be seen that the present invention provides a novel method of removing contaminants from liquids having a number of advantages and characteristics, including those hereinbefore pointed out and others which are inherent in the invention.

I claim:

1. A method for removing minor amounts of contaminating constituents from contaminated liquid organic oil material, said contaminants being insoluble in said organic material and in a sufficiently finely subdivided form so as to resist separation from said liquid by physical methods, said method including subdividing to colloidal size a mixed adsorbent material comprised of a mixture of an activated carbon adsorbent material and a zeolite molecular sieve adsorbent material, intimately mixing said mixed adsorbent material with said contaminated material, agitating said mixture with said adsorbent material therein, and thereafter separating said mixed adsorbent material from said organic material by physical means to produce an organic material free of said contaminants.

2. A method for removing contaminants as defined in claim 1 wherein said organic material is heated to at least about 50° C during treatment thereof.

3. A method for removing contaminants as defined in claim 1 wherein said contaminated material is simultaneously heated to at least 50°C and subjected to a high shear mixing action.

4. A method for removing contaminants as defined in claim 1 in which said contaminated material is a silicone oil adapted for use in an oil diffusion pump.

5. A method for removing contaminants as defined in claim 1 in which said contaminated material is a petroleum base oil having contaminants therein including iron, aluminum, metal soaps, and color-forming bodies.

6. A method as defined in claim 1 in which said mixed adsorbent material is added to said contaminated material in an amount of from about one part of adsorbent per 200 parts of contaminated material to about one part of adsorbent per 20 parts of contaminated material.

7. A method of treating a body of contaminated organic oil having dispersed therein as contaminants a minor amount of an insoluble material subdivided into particles of such size as to be highly dispersed within said liquid and to resist separation of said contaminants from said organic liquid by gravitational and other physical forces, said method including mixing and subdividing to colloidal size an activated carbon adsorbent material and a molecular sieve adsorbed material to form a mixed adsorbent of colloidal size particles, said mixed adsorbent material having a strongly adsorbed gas phase on the exterior of said adsorbent particles so as to render said mixture highly fluent, intimately mixing said mixed adsorbent and said contaminated organic oil to expose said contaminant particles to the gas phase on said adsorbent particles, and physically removing said mixed adsorbent particles from said oil with said contaminant particles adsorbed on the surface of said adsorbent particles.

8. A method as defined in claim 7 wherein said contaminated organic oil comprises a contaminated silicone oil.

9. A method as defined in claim 7 wherein said contaminated oil is a petroleum base oil having contaminants therein which include iron, aluminum, metal soaps, and color-forming bodies.

* * * * *